US011877352B2

(12) United States Patent
Zhang et al.

(10) Patent No.: US 11,877,352 B2
(45) Date of Patent: Jan. 16, 2024

(54) PHYSICAL LAYER PROTOCOL DATA UNIT (PPDU) FORMAT FOR WI-FI SENSING

(71) Applicant: QUALCOMM Incorporated, San Diego, CA (US)

(72) Inventors: Xiaoxin Zhang, Sunnyvale, CA (US); Stephen Jay Shellhammer, Ramona, CA (US); Kapil Rai, Sunnyvale, CA (US); Jayanand Asok Kumar, Fremont, CA (US); Vikram Kandukuri, Bangalore (IN); Sarin Mathen, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 17/237,908

(22) Filed: Apr. 22, 2021

(65) Prior Publication Data

US 2022/0346187 A1 Oct. 27, 2022

(51) Int. Cl.
*H04W 80/02* (2009.01)
*H04B 17/336* (2015.01)
(Continued)

(52) U.S. Cl.
CPC .......... *H04W 80/02* (2013.01); *H04B 17/336* (2015.01); *H04B 17/354* (2015.01); *H04B 7/0413* (2013.01); *H04W 84/12* (2013.01)

(58) Field of Classification Search
CPC ... H04W 84/12; H04W 84/005; H04W 8/005; H04W 64/003; H04W 64/006; H04W 56/0025; H04W 4/027; H04W 72/541; H04W 72/21; H04W 72/23; H04W 72/0446; H04W 72/0453; H04W 48/20; H04W 88/10; H04W 74/004; H04L 43/0829; H04L 5/0094; H04L 5/0053;
(Continued)

(56) References Cited

U.S. PATENT DOCUMENTS

2008/0018332 A1* 1/2008 Lieblich ............... G01R 33/441
324/309
2013/0235203 A1* 9/2013 Billington ............ G06V 10/145
348/148
(Continued)

OTHER PUBLICATIONS

International Search Report and Written Opinion—PCT/US2022/070965—ISA/EPO—dated Aug. 18, 2022.
(Continued)

*Primary Examiner* — Un C Cho
*Assistant Examiner* — Rasha K Fayed
(74) *Attorney, Agent, or Firm* — MG-IP Law, P.C.

(57) ABSTRACT

In an aspect, a wireless device is configured to transmit a physical layer protocol data unit on one or more channels, wherein the physical layer protocol data unit includes a first portion and a second portion. The first portion includes a signal length field indicating a duration of a transmission of the physical layer protocol data unit. The second portion includes a plurality of Wi-Fi sensing fields. The wireless device is configured to receive a reflected signal and a leakage signal associated with the physical layer protocol data unit. The reflected signal includes the physical layer (Continued)

protocol data unit reflected off of a target object. The leakage signal is associated with the physical layer protocol data unit.

34 Claims, 9 Drawing Sheets

(51) Int. Cl.
*H04B 17/354* (2015.01)
*H04B 7/0413* (2017.01)
*H04W 84/12* (2009.01)

(58) Field of Classification Search
CPC ... H04L 5/0091; H04L 5/0007; H04L 5/0037; H04L 5/0048; H04L 69/22; H04L 69/18; H04L 27/2602; H04L 27/26; H04L 27/2601; H04L 27/2603; H04L 27/2627; H04L 27/2636; H04L 27/2692; G01S 7/006; G01S 7/038; G01S 7/2883; G01S 7/288; G01S 7/527; G01S 7/2926; G01S 7/415; G01S 13/286; G01S 13/582; G01S 13/56; G01S 13/288; G01S 13/04; G01S 13/003; H04B 17/336; H04B 17/354; H04B 7/0413
See application file for complete search history.

(56) References Cited

U.S. PATENT DOCUMENTS

| | | | |
|---|---|---|---|
| 2014/0185695 A1* | 7/2014 | Kenney | H04L 1/08 375/260 |
| 2015/0195790 A1* | 7/2015 | Rong | H04W 52/243 370/311 |
| 2016/0142980 A1* | 5/2016 | Lee | H04W 52/38 370/336 |
| 2017/0142659 A1* | 5/2017 | Noh | H04W 52/0229 |
| 2017/0195915 A1* | 7/2017 | Zhang | H04W 52/02 |
| 2018/0317170 A1* | 11/2018 | Cariou | H04W 52/44 |
| 2020/0037357 A1* | 1/2020 | Chu | H04W 74/06 |
| 2020/0112939 A1* | 4/2020 | Scharf | H04W 64/003 |
| 2020/0136769 A1* | 4/2020 | Aboul-Magd | H04L 5/14 |
| 2020/0162963 A1* | 5/2020 | Alpert | H04L 1/0025 |
| 2020/0228634 A1* | 7/2020 | Noh | H04L 27/2666 |
| 2021/0045117 A1* | 2/2021 | Chen | H04L 69/22 |
| 2021/0278520 A1* | 9/2021 | Beg | G01S 13/003 |
| 2021/0307069 A1* | 9/2021 | Xin | H04B 7/0617 |
| 2021/0378054 A1* | 12/2021 | Belur Ramachandra | H04W 72/541 |
| 2021/0392660 A1* | 12/2021 | Chen | H04L 27/2613 |
| 2022/0022050 A1* | 1/2022 | Richards | H04W 74/08 |
| 2022/0030572 A1* | 1/2022 | Shellhammer | H04L 5/0087 |

OTHER PUBLICATIONS

Partial International Search Report—PCT/US2022/070965—ISA/EPO—dated Jun. 21, 2022.

* cited by examiner

PHYSICAL LAYER PROTOCOL DATA UNIT (PPDU) FORMAT FOR WI-FI SENSING

BACKGROUND OF THE DISCLOSURE

1. Field of the Disclosure

Aspects of this disclosure relate generally to Wi-Fi sensing, and particularly to a data unit format to use to enable Wi-Fi sensing.

2. Description of the Related Art

Wi-Fi sensing uses W-Fi based signals, e.g., signals compatible with the Institute of Electrical and Electronics Engineers (IEEE) 802.11 standard, to provide short-range (within a radius of approximately 7 meters) functionality. For Wi-Fi sensing, a single device may transmit and receive signals. Wi-Fi sensing may be used, for example, in a vehicle to determine the distance between the vehicle and other vehicles, determine whether the distance is increasing or decreasing (e.g., indicating the possibility of a collision between the vehicle and another vehicle), monitoring and identifying undesirable driver behavior (e.g., distracted, nodding off, asleep, or the like), and so on. Indoors, Wi-Fi sensing may be used to determine a location and track the movements of people, pets, and the like. However, there is currently no standard format for transmitting data to use for Wi-Fi sensing.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a physical layer protocol data unit (PPDU) includes a first portion and a second portion. The first portion includes a signal length field indicating a duration of a transmission of the PPDU. The first portion is recognized by an 802.11 compatible device and causes the 802.11 compatible device to not transmit for the duration of the transmission of the PPDU. The second portion includes a Wi-Fi signal field and a plurality of Wi-Fi Sensing fields. A device transmits the PPDU on one or more 802.11 compatible channels and receives: (i) a reflected signal comprising the PPDU reflected off of a target and (ii) a leakage signal associated with the PPDU. The device determines a distance to the target and a direction of the target relative to the device. Based on the distance and the direction, the device creates a map that includes the target.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof. A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
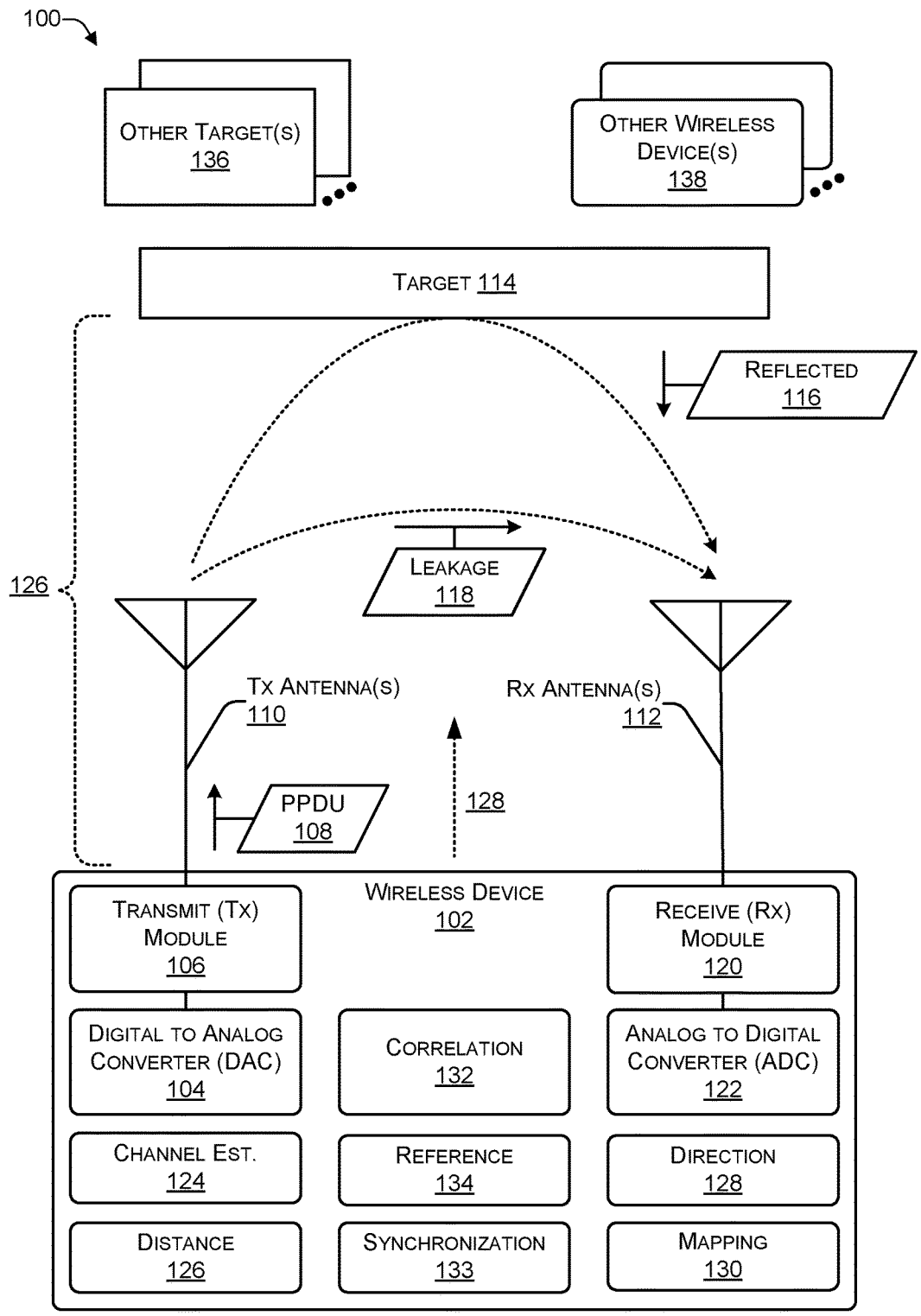
FIG. 1 illustrates an example wireless sensing system, according to various aspects of the disclosure.

Disclosed are systems and techniques for object detection based on radio frequency (RF) signals from a wireless device, such as an access point (AP), user equipment (UE), etc. The wireless device may include both the transmitter and receiver. The wireless device may transmit a set of (e.g., one or more) RF signals at least for object detection and, in some cases, for both object detection and communication. For example, the RF signals may be used to transmit one or more physical layer protocol data units (PPDUs). Each PPDU may include a first portion that is backward compatible with the 802.11 standard. Transmitting the PPDU may cause other devices (e.g., other 802.11 devices) within a reception range of the PPDU to stop transmitting during the time that the PPDU is being transmitted, e.g., to avoid a packet collision with the PPDU. Each PPDU may include a second portion that is used for Wi-Fi Sensing. In some cases, the first portion of the PPDU may be transmitted at a first power level and the second portion of the PPDU may be transmitted at a second power level that is less than the first power level. Transmitting the first portion of the PPDU at the first (e.g., higher) power level may prevent other devices from transmitting while the PPDU is being transmitted, thereby keeping RF spectrum within a particular distance from the computing device free from other packets that could potentially interfere with the Wi-Fi sensing. Transmitting the second portion of the PPDU at the second (e.g., lower) power level may prevent the receiver from becoming saturated (e.g., overloaded) because the transmitter and the receiver are located in the wireless device.

The second portion of the PPDU may include a signal data field (WiS-SIG) and a sequence of Wi-Fi sensing signals (WiS-1 to WiS-N, where is an integer and N>0). The signal data field may indicate a length of the second portion of the PPDU (e.g., length=N), a sequence type, a number of transmit (Tx) antennas, whether the signal is a single stream or multi-stream (e.g., multiple input multiple output (MIMO)), other data associated with the Wi-Fi sensing signals, or any combination thereof. The sequence type may indicate whether the Wi-Fi sensing's signals are (1) time domain-based sequences (e.g., Zadoff-Chu), or (2) frequency domain-based (e.g., long training field (LTF) based orthogonal frequency division multiplexing (OFDM)) sequences. The content of each of the Wi-Fi sensing signals WiS-1 to WiS-N may be the same. After being received, the Wi-Fi sensing signals WiS-1 to WiS-N may be averaged to improve a signal-to-noise ratio (SNR).

The transmitted PPDU may reflect off of a target that is within the sensing area (e.g., about 7 meters) to create a reflected PPDU that is received by the receiver. The transmitted PPDU may be directly received, e.g., without reflecting off of the target, by the receiver as a leakage PPDU. The wireless device may use the reflected PPDU and the leakage PPDU to determine a distance between the wireless vice and the target and to determine a direction of the target relative to the wireless device. In this way, the wireless device can create a map of objects within the sensing area that includes the target.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "example" and/or "example" are used herein to mean "serving as an example, instance, or illustration." Any aspect described herein as "example" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable device (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send RF signals to a base station is called an uplink (UL) channel (e.g., a reverse traffic channel, a reverse control channel, an access channel, etc.). A communication link through which the base station can send RF signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal," a "sensing signal," a "radio wave," a "waveform," or the like, or simply a "signal" where it is clear from the context that the term "signal" refers to a wireless signal or an RF signal.

As a first example, a computing device, such as an access point, may perform a method. The method may include transmitting a physical layer protocol data unit (PPDU) on one or more channels. The PPDU may include (1) a first portion that includes a short training field (STF), a long training field (LTF), and a signal length field (L-SIG) indicating a duration of a transmission of the PPDU and (2) a second portion that includes a plurality of Wi-Fi Sensing (WiS) fields. The first portion of the PPDU may be compatible with an 802.11a standard, an 802.11n standard, an 802.11ac standard, an 802.11ax standard, an 802.11be standard, and the like. The second portion of the PPDU may also include: a sequence type field to indicate that individual WiS fields of the plurality of WiS fields comprise either time domain sequences (e.g., Zadoff-Chu based sequences) or frequency domain sequences (e.g., orthogonal frequency division multiplexing (OFDM) based sequences), a number of transmit antennas used to transmit the PPDU, and a stream type field to indicate that the plurality of WiS fields comprise either a single stream or multiple-input multiple-output (MIMO) streams. Transmitting the PPDU on the one or more channels may include: (1) transmitting the first portion of the PPDU at a first power level and (2) transmitting the second portion of the PPDU at a second power level that is less than the first power level (e.g., up to 20 decibels (db) less). The method may include receiving a reflected signal associated with the PPDU. For example, the reflected signal may include the PPDU reflected off of a target object. The method may include receiving a leakage signal associated with the PPDU. The method may include determining an average WiS of the plurality of WiS fields (e.g., of the reflected signal and of the leakage signal). For example, the average WiS has an increased signal-to-noise ratio relative to individual WiS fields of the plurality of WiS fields. The method may include performing channel estimation (e.g., of the reflected signal and of the leakage signal) based at least in part on comparing the plurality of WiS fields with one or more reference fields. The method may include determining, based at least in part on the reflected signal and the leakage signal, a distance to the target object, determining, based at least in part on the reflected signal and the leakage signal, a direction of the target object, and creating, based at least in part on the distance to the target object and the direction of the target object, a map that includes an approximate location of the target object.

As another example, an access point may include: (1) a transmit antenna array and (2) a transmit module that is configured to transmit, using the transmit antenna array, a physical layer protocol data unit (PPDU) on one or more channels. The PPDU may include: (1) a first portion that includes: a short training field (STF), a long training field (LTF), and a signal length field (L-SIG) indicating a duration of a transmission of the PPDU and (2) a second portion that includes a plurality of Wi-Fi Sensing (WiS) fields, such as a sequence type field to indicate that individual WiS fields of the plurality of WiS fields comprise either time domain sequences (e.g., Zadoff-Chu based sequences) or frequency domain sequences (e.g., orthogonal frequency division multiplexing (OFDM) based sequences), a number of transmit antennas used to transmit the PPDU, and a stream type field to indicate that the plurality of WiS fields comprise either a single stream or multiple-input multiple-output (MIMO) streams. The first portion of the PPDU is transmitted at a first power level and the second portion of the PPDU is transmitted at a second power level that is less (e.g., up to about 20 db less) than the first power level. The first portion of the PPDU is compatible with an 802.11a standard, an 802.11n standard, an 802.11ac standard, an 802.11ax standard, and an 802.11be standard. For example, an 802.11 compatible device receiving the PPDU stops transmitting for a duration of time based at least in part on the signal length field (L-SIG). The access point may also include a receive antenna array and a receive module configured to (1) receive a reflected signal associated with the PPDU, where the reflected signal includes the PPDU reflected off of a target object and (2) receive a leakage signal associated with the PPDU. The access point may include one or more processors and one or more non-transitory computer-readable storage media to store instructions executable by the one or more processors to perform various operations. For example, the instructions may be executable to determine, based at least in part on the reflected signal and the leakage signal, a distance to the target object, determine, based at least in part on the reflected signal and the leakage signal, a direction of the target object, and create, based at least in part on the distance to the target object and the direction of the target object, a map that includes an approximate location of the target object. The instructions may be executable to determine an average WiS of the plurality of WiS fields because the average WiS has an increased signal-to-noise ratio relative to individual WiS fields of the plurality of WiS fields. The instructions may be executable to perform channel estimation based at least in part on comparing the plurality of WiS fields with one or more reference fields.

As a further example, one or more non-transitory computer-readable storage media may store instructions that are executable by one or more processors to perform various operations. The instructions may be executable to transmit a physical layer protocol data unit (PPDU) on one or more channels. The PPDU includes: (1) a first portion that includes a short training field (STF), a long training field (LTF), and a signal length field (L-SIG) indicating a duration of a transmission of the PPDU and (2) a second portion that includes a plurality of Wi-Fi Sensing (WiS) fields, such as a sequence type field to indicate that individual WiS fields of the plurality of WiS fields comprise either time domain sequences (e.g., Zadoff-Chu based sequences) or frequency domain sequences (e.g., orthogonal frequency division multiplexing (OFDM) based sequences), a number of transmit antennas used to transmit the PPDU, and a stream type field to indicate that the plurality of WiS fields comprise either a single stream or multiple-input multiple-output (MIMO) streams. The first portion of the PPDU is compatible with various 802.11 standards, such as, for example, an 802.11a standard, an 802.11n standard, an 802.11ac standard, an 802.11ax standard, and an 802.11be standard. The first portion of the PPDU may be transmitted at a first power level and the second portion of the PPDU may be transmitted at a second power level that is less (e.g., up to about 20 db less) than the first power level. The instructions may be executable to receive a reflected signal associated with the PPDU, the reflected signal comprising the PPDU reflected off of a target object and receive a leakage signal associated with the PPDU. The instructions may be executable to determine an average WiS of the plurality of WiS fields (e.g., of the reflected signal and the leakage signal). For example, the average WiS has an increased signal-to-noise ratio relative to individual WiS fields of the plurality of WiS fields. The instructions may be executable to perform channel estimation (e.g., of the reflected signal and the leakage signal) based at least in part on comparing the plurality of WiS fields with one or more reference fields. The instructions may be executable to determine, based at least in part on the reflected signal and the leakage signal, a distance to the target object, determine, based at least in part on the reflected signal and the leakage signal, a direction of the target object, and create, based at least in part on the distance to the target object and the direction of the target object, a map that includes an approximate location of the target object.

FIG. 1 illustrates an example wireless sensing system 100, according to various aspects of the disclosure. The system 100 may include a wireless device 102, such as, for example, an access point (AP), a user equipment (UE), or the like. The wireless device 102 may include a digital to analog converter 104 connected to a transmit module 106. For example, the digital to analog converter 104 may convert a digital signal to an analog signal and provide the analog signal to the transmit module 106 for transmission. The transmit module 106 may create, based on the analog signal, a PPDU 108. The transmit module 106 may transmit the PPDU 108 using a transmit antenna array 110 (e.g., one or more transmit (Tx) antennas).

A receive antenna array 112 (e.g., one or more receive (Rx) antennas) of the wireless device 102 may be used to receive one or more signals derived from the PPDU 108. For example, the PPDU 108 may reflect off of a representative target 114 to create a reflected signal 116 corresponding to the PPDU 108. The Rx antenna array 112 may receive the reflected signal 116. The Rx antenna array 112 may receive the PPDU 108 directly, e.g., without reflecting off of the target 114, in the form of a leakage signal 118. After being received by the Rx antennas 112, the reflected signal 116 and the leakage signal 118 may be sent to a receive module 120 and then processed using an analog to digital converter 122 to convert each of the signals 116, 118 from analog to digital.

The wireless device 102 may use the reflected signal 116 and the leakage signal 118 to perform channel estimation 124. The PPDU 108 may be sent using one or more channels and may become distorted or noise may be added while the PPDU 108 travels through the channels. To remove the distortion and noise added by the channel to the received signals 116, 118, the wireless device 102 may determine characteristics of the channel that the PPDU 108 has gone through by performing channel estimation 124.

The wireless device 102 may use the reflected signal 116 and the leakage signal 118 to determine a distance 126 between the wireless device 102 and the target 114. The wireless device 102 may use the reflected signal 116 and the leakage signal 118 to determine a direction 128 (e.g., in two dimensions or three dimensions) of the target 114 relative to the wireless device 102. The wireless device 102 may use the distance 126 in the direction 128 to create a mapping 130 of objects within a particular distance (e.g., approximately at least 7 meters) from the wireless device 102.

The wireless device 102 may perform correlation 132 of the reflected signal 116 and the leakage signal 118 by comparing the received signal (e.g., one of the signals 116, 118) with a reference signal 134 (e.g., known signal)) to identify which fields of the PPDU 108 were received. The correlation 132 process may enable the wireless device 102 to determine where a Wi-Fi sensing portion of the PPDU starts and ends to enable synchronization 133 in which the receive module 120 synchronizes receiving a signal, such as, the reflected signal 116 and the leakage signal 118. If channel estimation 124 is done in the time domain, a time-domain waveform may be stored as the reference signal 134, the received signal (e.g., leakage signal 118, reflected signal 116) may be converted into the time domain, and the correlation 132 may be performed to estimate the channel. If channel estimation 124 is done in the frequency domain, the frequency-domain waveform may be stored as the reference signal 134, the received signal may be converted to the frequency domain, and a frequency-domain channel estimation algorithm (e.g., zero-forcing channel estimation or similar) may be used to perform the channel estimation 124.

Of course, in some cases, the system 100 may include more than the representative target 114, such as other targets 136. For example, the mapping 130 may include the target 114 and the other targets 136.

The PPDU 108 may have a format that is backward compatible with other 802.11 standards. For example, the PPDU 108 may appear as an 802.11 data unit when the wireless device 102 begins to broadcast the PPDU 108, causing the other wireless devices 138 to not transmit for a particular length of time, e.g., as specified in a signal length field of the PPDU 108. The other wireless devices 138 may not transmit any packets while the wireless device 102 is transmitting the PPDU 108 to prevent a packet collision with the PPDU 108.

Though there may be a small amount of delay between a time that the transmit module 106 transmits the PPDU 108 and a time that the receive module 120 receives the reflected signal 116, the leakage signal 118, or both, such usage is considered concurrent Tx and Rx because the transmission of the PPDU 108 and the receiving of the signals 116, 118 occur substantially concurrently.

Thus, a wireless device may use a Tx antenna to transmit a PPDU. A first portion of the PPDU may be backward-compatible with the 802.11 standard, thereby causing other wireless devices to not transmit packets while the PPDU is being transmitted. A second portion of the PPDU may be used for wireless sensing. For example, the PPDU may reflect off of a target object to create a reflected signal that is received by an Rx antenna of the wireless device. As another example, the PPDU may be directly received by the Rx antenna without being reflected off of the target object in the form of a leakage signal. The wireless device may use the reflected signal and the leakage signal to determine a distance between the wireless device and the target and a direction of the target relative to the wireless device. In this way, the wireless device may create a mapping of one or more targets within a particular vicinity of the wireless device. For example, the wireless device may be used in a vehicle to determine whether the distance between the vehicle and a second vehicle is decreasing and may cause a collision. In such situations, a collision avoidance system in the vehicle may use the distance data from the wireless device to alert the driver of the vehicle, automatically apply braking to slow the vehicle down and maintain a minimum distance between the vehicle and the second vehicle, perform another action (e.g., an evasive maneuver) to prevent or reduce the effect of a collision, or any combination thereof.

Figure 2:
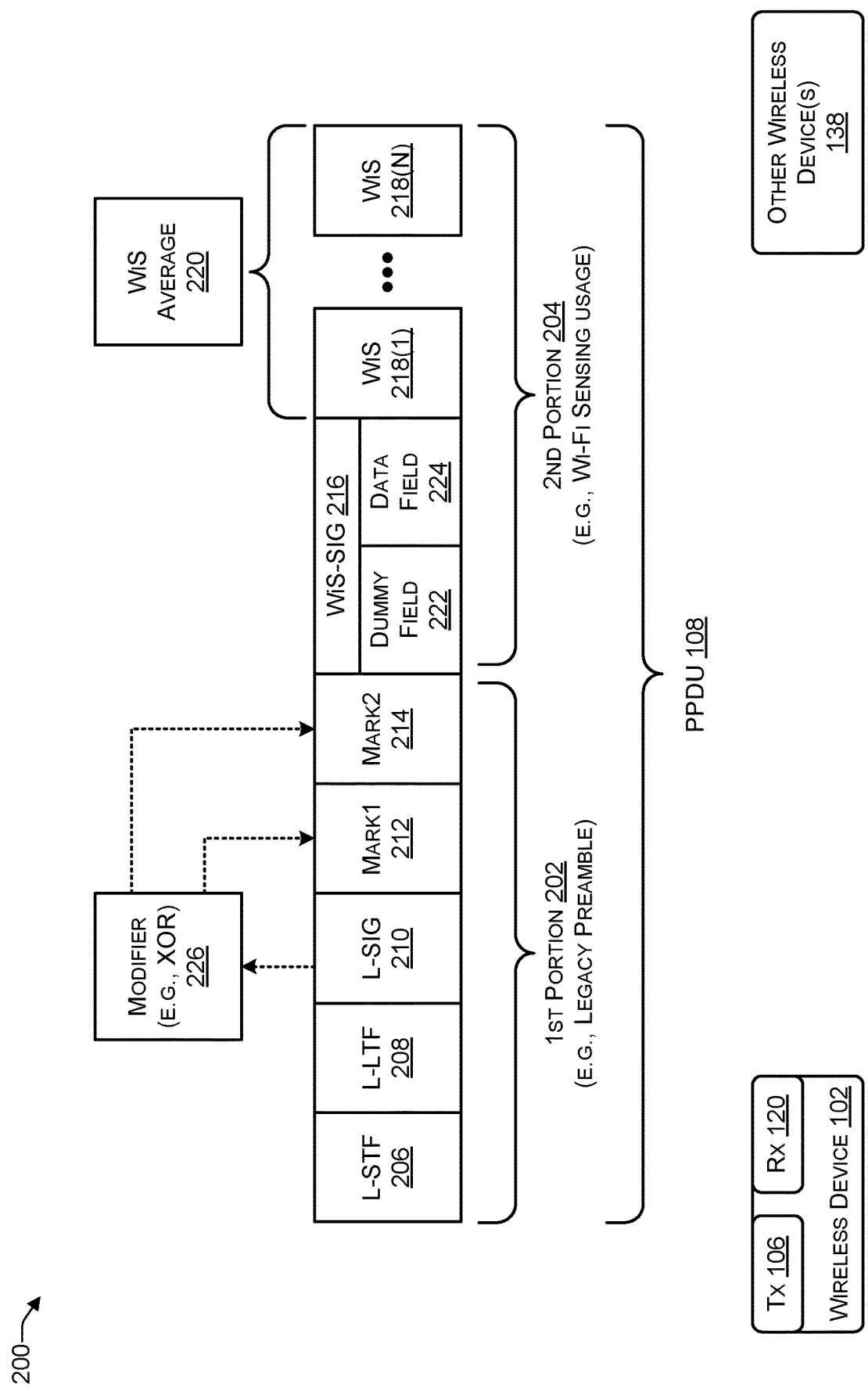
FIG. 2 illustrates an example PPDU format, according to aspects of the disclosure.

FIG. 2 illustrates an example PPDU format 200, according to aspects of the disclosure. The PPDU 108 may include a first portion 202 and a second portion 204. The first portion 202 (also referred to as a legacy preamble) may be backward-compatible with various versions of the IEEE 802.11 standard. The second portion 204 may be used for Wi-Fi sensing as described herein.

The first portion 202 of the PPDU 108 may include a short training field (L-STF) 206, a long training field (L-LTF) 208, a signal field (L-SIG) 210, a Mark1 field 212, and a Mark2 field 214. The L-STF 206 may be used for coarse synchronization and the L-LTF may be used for fine synchronization (e.g., the synchronization 133 of FIG. 1) and initial channel estimation (e.g., when performing the channel estimation 124 in FIG. 1). The L-SIG 210 may be decoded by receiving devices, such as the wireless device 102 and the other wireless devices 138, to determine transmission parameters, including a length (e.g., a duration) of the PPDU 108. When the wireless device 102 begins transmitting the PPDU 108, the other wireless (e.g., 802.11 compatible) devices 138 may receive the PPDU 108, determine the duration of the PPDU 108 based on the L-SIG 210, and not transmit for the duration of the PPDU 108, e.g., to prevent a packet collision. The Mark1 field 212 and the Mark2 field 214 may be encoded using Binary Phase Shift Keying (BPSK) and may be present in some of the previous IEEE 802.11 standards, as indicated in Table 1.

TABLE 1

| Standard | Mark1 | Mark2 |
| --- | --- | --- |
| 802.11b | No | No |
| 802.11a | No | No |
| 802.11n | Yes | No |
| 802.11ac | Yes | Yes |
| 802.11ax | Yes | Yes |
| 802.11ba | Yes | Yes |

The second portion 204 of the PPDU 108 may include a Wi-Fi sensing (WiS) signal field (WiS-SIG) 216, and multiple Wi-Fi sensing fields 218, e.g., WiS field 218(1) to WiS field 218(N), where N>1. Typically, N=32 or N=64 as the greater N, the greater the signal to noise ratio (SNR). The content of each of the WiS fields 218 may be identical during transmission. The receiver, such as the wireless device 102, may determine a WiS average 220 of each of the WiS fields 218. For example, the WiS average 220 may have an increased SNR compared to one or more of the WiS fields 218.

To reduce packet collisions, the wireless device 102 may transmit the first portion 202 at a first power level that is higher than a second power level at which the second portion 204 is transmitted. By doing so, the first portion 202 may be received by the other wireless devices 138, e.g., within a distance from the wireless device 102 that is at least 7 meters, thereby causing the other wireless devices 138 to not transmit packets while the PPDU 108 is being transmitted. To prevent a receiver, such as the receive module 120 of FIG. 1, from becoming saturated when receiving the second portion 204, the wireless device 102 may transmit the second portion 204 at the second power level that is lower than the first power level. In this way, the higher power level of the first portion 202 clears the 802.11 spectrum while the lower power level of the second portion 204 prevents saturation of the receive module 120 of FIG. 1. For example, the 1st power level (at which the 1st portion 202 is transmitted) may be up to about 20 decibels (dB) greater than the 2nd power level (at which the 2nd portion 204 is transmitted) to reduce the possibility of receiver saturation.

The WiS-SIG 216 may, in some cases, include a dummy field 222 that is transmitted prior to a data field 224. The dummy field 222 may enable a receiving device, such as the wireless device 102, to delay turning on the receiver (e.g., the receive module 120 of FIG. 1) until after the first portion 202 has been transmitted. Because the receiving device may not be able to precisely time when transmission of the second portion 204 begins (e.g., to turn on the receiver after the first portion 202 has been transmitted), the dummy field 222 provides a time window during which the receiving device can turn on the receiver without missing the useful fields (e.g., starting with the data field 224) of the second portion 204. The dummy field 222 may be up to about 4 microseconds (μs) in length, in keeping with the length of the individual fields 206, 208, 210 of the 1st portion 202.

The data field 224 may provide information associated with the second portion 204, such as a sequence length (e.g., the value of N) of the WiS fields 218. The data field 224 may provide information about a sequence type of the WiS fields 218, such as, for example, whether the WiS fields 218 include a time domain sequence (e.g., Zadoff-Chu sequence) or a frequency domain sequence (e.g., LTF-type OFDM sequence). Zadoff-Chu or OFDM may be used because both have excellent correlation properties as compared to other types of sequences. Correlation may enable the Rx module 120 of FIG. 1 to quickly (e.g., with fewer computations) perform correlation and channel estimation 124. Correlation may enable the Rx module 120 to determine where the WiS field 218(1) begins and where the WiS field 218(N) ends. The data field 224 may indicate the number of transmit (Tx) antennas used to transmit the PPDU 108. The data field 224 may indicate whether the PPDU 108 is being transmitted as a single stream or as a multiple input multiple output (MIMO) stream. Of course, the data field 224 may include additional information associated with the second portion 204 of the PPDU 108. The Rx module 120 may perform synchronization 133 and channel estimation 124. Synchronization 133 may use correlation 132 as it is typically done in the time-domain, or at least first done in the time-domain by using correlation, and then may be fine-tuned in the frequency domain by using other algorithms besides correlation 132. Channel estimation 124 may use correlation 132 in the time domain or may use zero-forcing (or other algorithms) in the frequency domain.

In some variations of 802.11 (e.g., 80211ax and 802.11be), the contents of the Mark1 field 212 and the Mark2 field 214 may be the L-SIG 210 modified using a modifier 226. For example, in some variations of 802.11, the contents of the Mark1 field 212 and the Mark2 field 214 may be a logical complement of the L-SIG 210. In some cases, the wireless device 102 may set the contents of the Mark1 field 212 and the Mark2 field 214 in the PPDU 108 to be a logical complement of the L-SIG 210. In other cases, the wireless device 102 may set the contents of the Mark1 field 212 and the Mark2 field 214 in the PPDU 108 to be an exclusive OR (XOR) of the L-SIG 210. Of course, another logical modifier besides logical complement or XOR may be used to modify the L-SIG 210 for use in the Mark1 field 212, the Mark2 field 214, or both.

Though the wireless device 102 includes both the transmit module 106 and the receive module 120, the WiS-SIG 216 may be used to provide signal-related information rather than communicating the signal-related information using a connection on a circuit board of the wireless device 102. For example, if the transmit module 106 uses a first integrated circuit (IC) and the Rx module 120 may uses a second IC, the signal latency when transferring the signal-related information between the two ICs may not be suitable for use with Wi-Fi sensing.

Each of the WiS fields 218 may have a length of between about 3.6 microseconds (μs) to about 4 μs when a very-high-throughput (VHT)-LTF is used. If a high efficiency (HE)-LTF is used, then the length of each of the WiS fields 218 may be about 4 μs (e.g., 1×LTF=1×4 μs), about 8 μs (e.g., 2×LTF=2×4 μs), about 16 μs (e.g., 4×LTF=4×4 μs), or another length as per the 802.11 specification. For MIMO, the number of streams may be up to 8 streams. The WiS fields 218 may have a bandwidth of, for example, 20 megahertz (MHz), 40 MHz, 80 MHz, 160 MHz, or 320 MHz.

Thus, by creating a first portion of the PPDU that is recognized by 802.11 compatible devices and broadcasting the first portion at a first power level, a wireless device may prevent packet collisions from occurring during the broadcast of the PPDU. For example, 802.11 compatible devices may receive the transmission of the PPDU, determine a duration of the PPDU, and not transmit for the duration of the transmission of the PPDU. The second portion of the PPDU may be broadcast at a second power level that is lower than the first power level to avoid saturating the receiver in the wireless device. The second portion of the PPDU may include multiple WiS fields, with each field having the same content. The multiple WiS fields may be averaged to increase SNR. A signal field in the second portion may include a dummy field at the beginning of the second portion to enable a receiver to be turned on after the first portion of the PPDU has been broadcast without missing the data field in the signal field.

Figure 3:
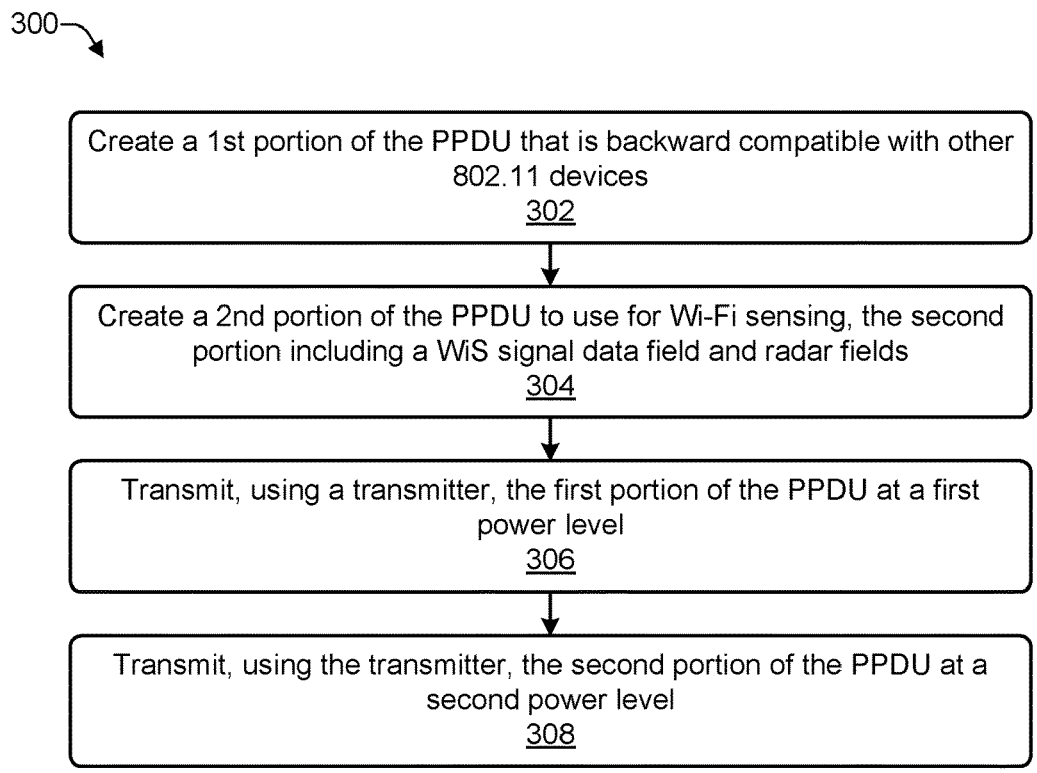
FIG. 3 illustrates an example process that includes creating a PPDU, according to aspects of the disclosure.
Figure 4:
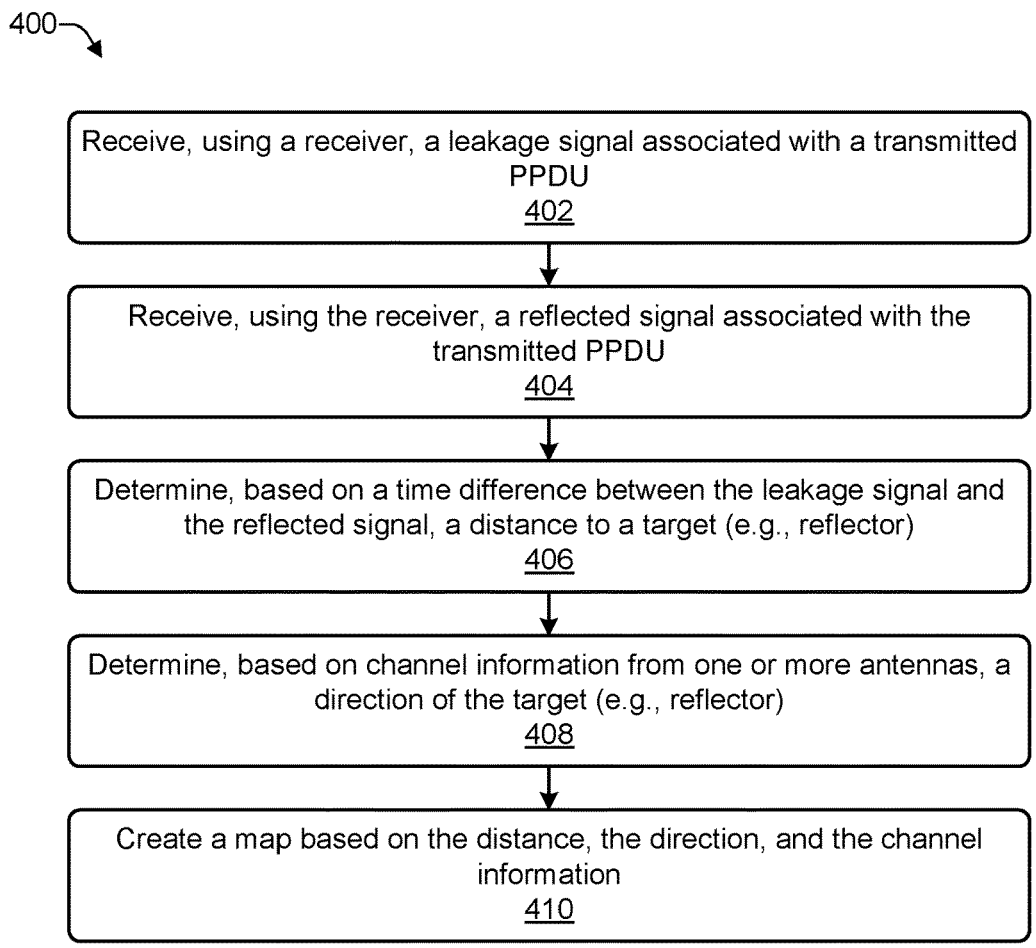
FIG. 4 illustrates an example process that includes receiving a leakage signal associated with a PPDU and a reflected signal associated with the PPDU, according to aspects of the disclosure.
Figure 5:
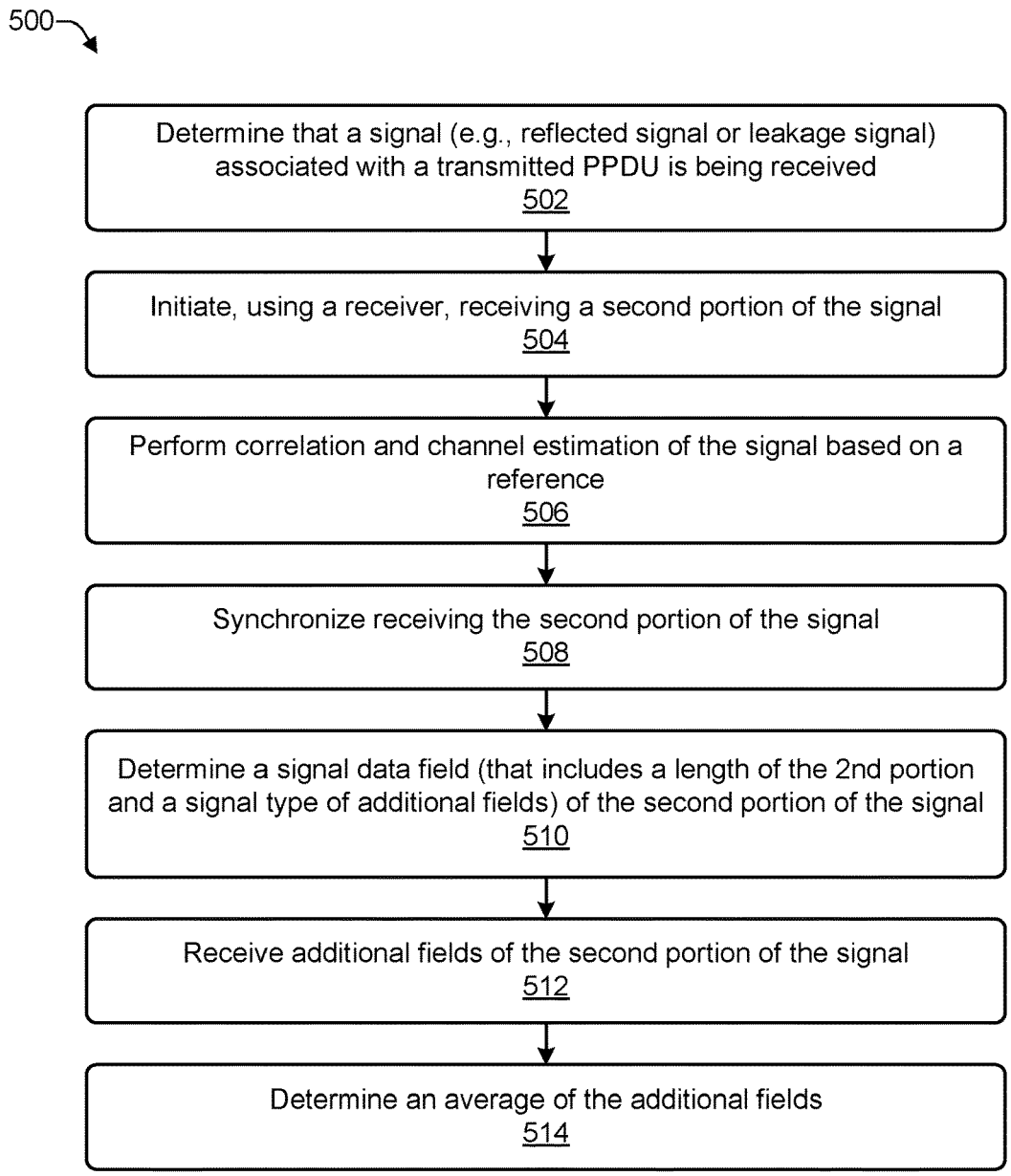
FIG. 5 illustrates an example process that includes receiving a signal, according to aspects of the disclosure.

In the flow diagrams of FIGS. 3, 4, and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, and 500 are described with reference to FIGS. 1 and 2 as described above, although other models, frameworks, systems, and environments may be used to implement these processes.

FIG. 3 illustrates an example process 300 that includes creating a PPDU, according to aspects of the disclosure. The process 300 may be performed by a device, such as the wireless device 102 of FIG. 1 and FIG. 2.

At 302, the process may create a first portion of the PPDU that is backward-compatible with other 802.11 devices. At 306, the process may create a second portion of the PPDU to use for Wi-Fi sensing. The second portion may include a signal data field and multiple Wi-Fi sensing fields. For example, in FIG. 2, the wireless device 102 may create the first portion 202 of the PPDU 108. The first portion 202 may be backward-compatible with and understood by the other wireless devices 138. The second portion 204 of the PPDU 108 may be used for Wi-Fi sensing. After the wireless device 102 begins transmitting the PPDU 108, the other wireless devices 138 may recognize the first portion 202 and, to prevent a packet collision, temporarily refrain from transmitting while the PPDU 108 is being transmitted. For example, the other wireless devices 138 may decode the duration of the PPDU 108 based on the L-SIG field 210 and not transmit for the duration of the PPDU 108.

At 308, the process may transmit using a transmitter the first portion of the PPDU at a first power level. At 310, the process may transmit using the transmitter the second portion of the PPDU at a second power level. The second power level may be lesser than the first power level. For example, in FIG. 2, the wireless device 102 may transmit the first portion 202 at a first power level and transmit the second portion 204 at a second power level. The second power level may be less than the first power level. By transmitting the first portion 202 at the first power level, the PPDU 108 may be transmitted at least a predetermined distance (e.g., 7 meters) from the wireless device 102 and prevent interference from the other wireless devices 138. By transmitting the second portion 204 at the second power level, the receiver module of the wireless device 102 may not become saturated. Transmitting the PPDU 108 using the wrong power levels may result in saturation of the receiver module because the PPDU 108 is being transmitted and received substantially concurrently by the same device, e.g., the wireless device 102.

FIG. 4 illustrates an example process 400 that includes receiving a leakage signal associated with a PPDU and a reflected signal associated with the PPDU, according to aspects of the disclosure. The process 400 may be performed by a device, such as the wireless device 102 of FIG. 1 and FIG. 2.

At 402, the process may receive, using a receiver (e.g., receive module), a leakage signal associated with a transmitted PPDU. At 404, the process may receive, using the receiver, a reflected signal associated with the transmitted PPDU. For example, in FIG. 1, the Rx module 120 of the wireless device 102 may receive the reflected signal 116 after the PPDU 108 has been transmitted and reflects off of the target 114. The Rx module 120 may directly receive the leakage signal 118 after the PPDU 108 has been transmitted, e.g., without the leakage signal 118 reflecting off of a target, such as the target 114.

At 406, the process may determine, based on a time difference between the leakage signal and the reflected signal, a distance to a target (e.g., reflector). For example, in FIG. 1, the wireless device 102 may determine the distance 126 between the wireless device 102 and the target 114 based on a time difference between (i) a first point in time when the leakage signal 118 is received and (ii) a second point in time when the reflected signal 116 is received.

At 408, the process may determine, based on channel information from one or more antennas a direction (e.g., relative to the wireless device) of the target. For example, in FIG. 1, the wireless device 102 may determine the direction 128 of the target 114 relative to the wireless device 102 based on channel information determined based on when the reflected signal 116 in the leakage signal 118 is received by each of the one or more Rx antennas 112. For example, if the reflected signal 116 is received by a first antenna before being received by a second antenna, then the wireless device 102 may determine that the target 114 is closer to the first antenna as compared to the second antenna and determine the approximate direction 128 of a location of the target 114 relative to the wireless device 102.

At 410, the process may create a map based on one or more of the distance, the direction, and the channel information. For example, in FIG. 1, the wireless device 102 may create the mapping 130 that includes a map of an area within a predetermined distance from the wireless device 102. The mapping 130 may include the target 114 and the other targets 136.

Thus, a receive module of a wireless device may receive a leakage signal associated with a PPDU and a reflected signal associated with the PPDU that was reflected off of a target. The receive module may determine, based on the leakage signal and the reflected signal, a distance, and a direction to the target. A similar process may be used to determine a distance and a direction of other targets in the area. The receive module may create a map that includes the target and, if present, other targets. In this way, 802.11 based signals may be used to enable Wi-Fi sensing.

FIG. 5 illustrates an example process 500 that includes receiving a signal, according to aspects of the disclosure. The process 500 may be performed by a device, such as the wireless device 102 of FIG. 1 and FIG. 2.

At 502, the process may determine that a signal (e.g., a reflected signal or a leakage signal) associated with a transmitted PPDU is being received. At 504, the process may initiate using a receiver (e.g., Rx module) receiving a second portion of the signal. For example, in FIG. 2, the Rx module 120 may determine that a signal associated with the PPDU 108 is being received and initiate using the Rx module 120 receive the second portion 204.

At 506, the process may perform correlation and channel estimation of the signal based on a reference. For example, in FIG. 1, the wireless device 102 may perform the correlation 132 and the channel estimation 124 using the reference 134.

At 508, the process may synchronize receiving the second portion of the signal. At 510, the process may determine a signal data field (that includes a length of the second portion and a single type of additional fields) of the second portion of the signal. At 510, the process may receive additional fields of the second portion of the signal. At 514, the process may determine an average of the additional fields. For example, in FIG. 2, the Rx module 120 may synchronize receiving the second portion 204 and receive the data field 224 of the WiS-SIG field 216. The Rx module 120 may receive the additional Wi-Fi sensing fields WiS 218(1) to WiS 218(N) and determine the WiS average 220. For example, the WiS average 220 may have a higher SNR as compared to one or more of the WiS fields 218.

Figure 6:
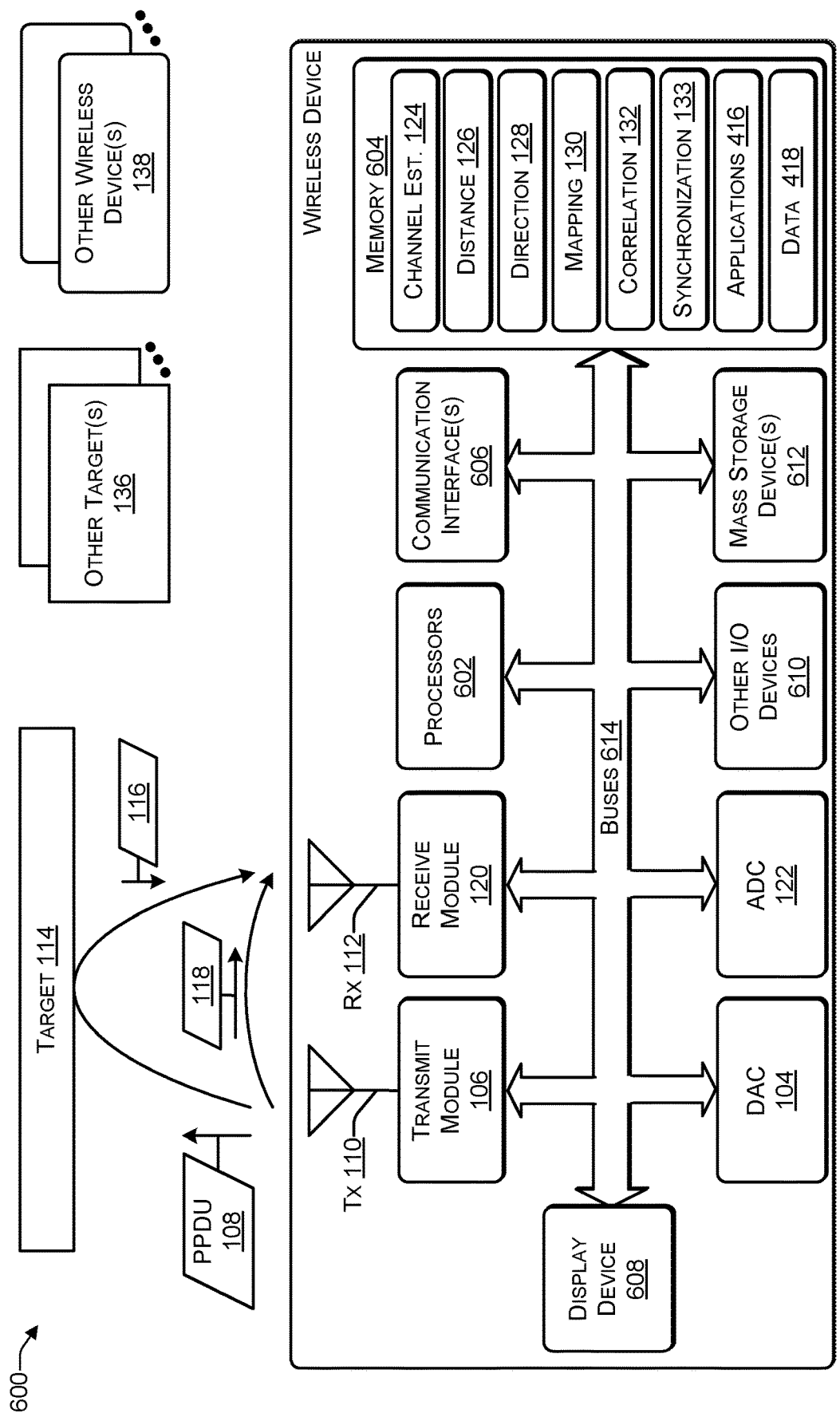
FIG. 6 illustrates a wireless device, in accordance with an aspect of the disclosure.

FIG. 6 illustrates a wireless device 600 that may be used to implement the wireless device 102 and the other wireless devices 138 of FIG. 1. The wireless device 102 (and the other wireless devices 138) may include one or more processors 602 (e.g., CPU, GPU, or the like), a memory 604, communication interfaces 606, a display device 608, other input/output (I/O) devices 610 (e.g., keyboard, trackball, and the like), and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The device 600 may include one or more communication interfaces 606 for exchanging data. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth.

The computer storage media, such as memory 604 and mass storage devices 612, may be used to store software and data. For example, the computer storage media may be used to store the channel estimation 124, the distance 126, the direction 128, the mapping 130, the correlation 132, other applications 415, and other data 418. The wireless device 102 (and the other wireless devices 138) may each include the transmit module 106, the transmit antenna array 110, the receive module 120, and the receive (Rx) antenna array 112.

Figure 7A:
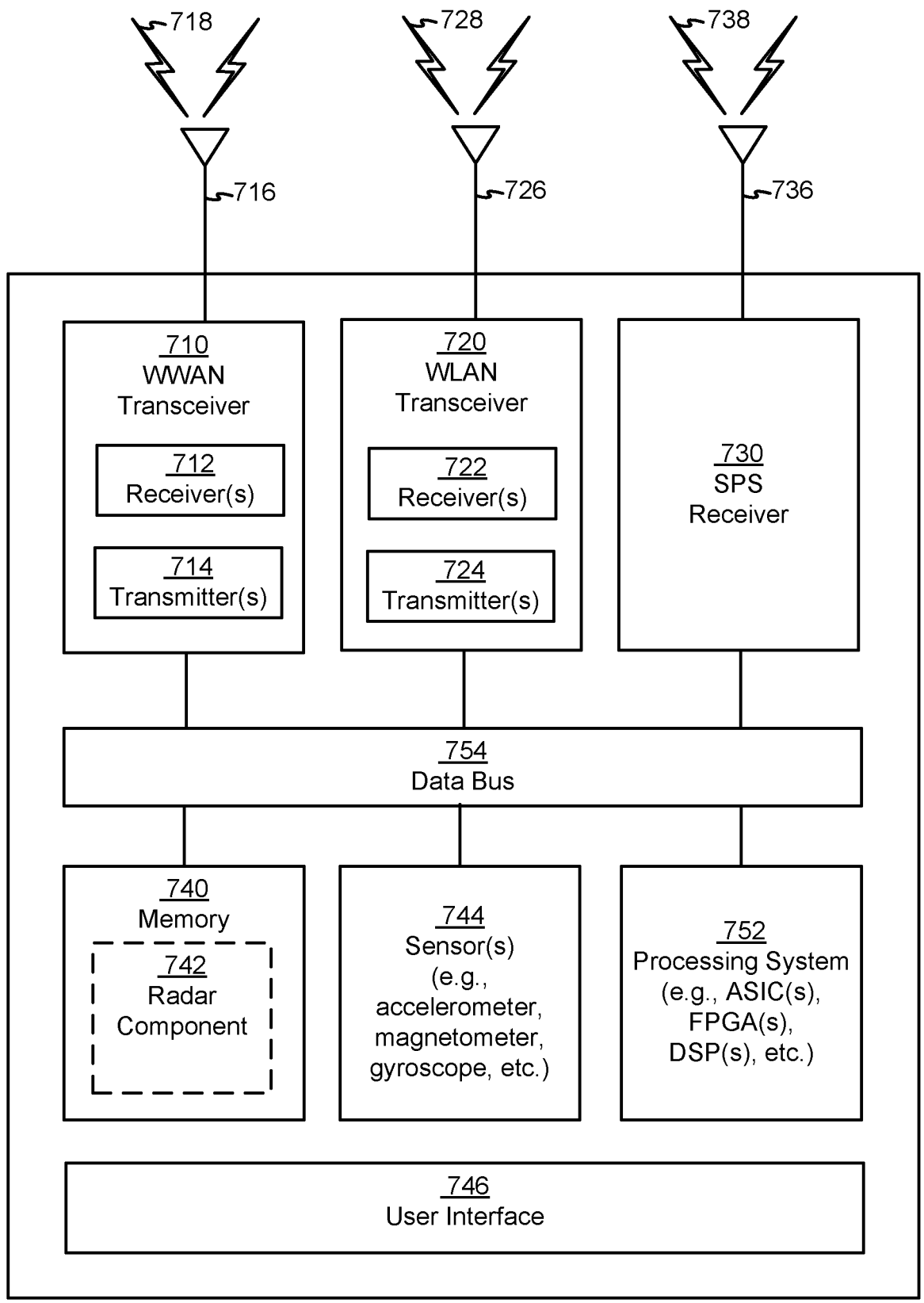
FIGS. 7A and 7B are simplified block diagrams of several sample aspects of components that may be employed in wireless communication nodes and configured to support communication as described herein.
Figure 7B:
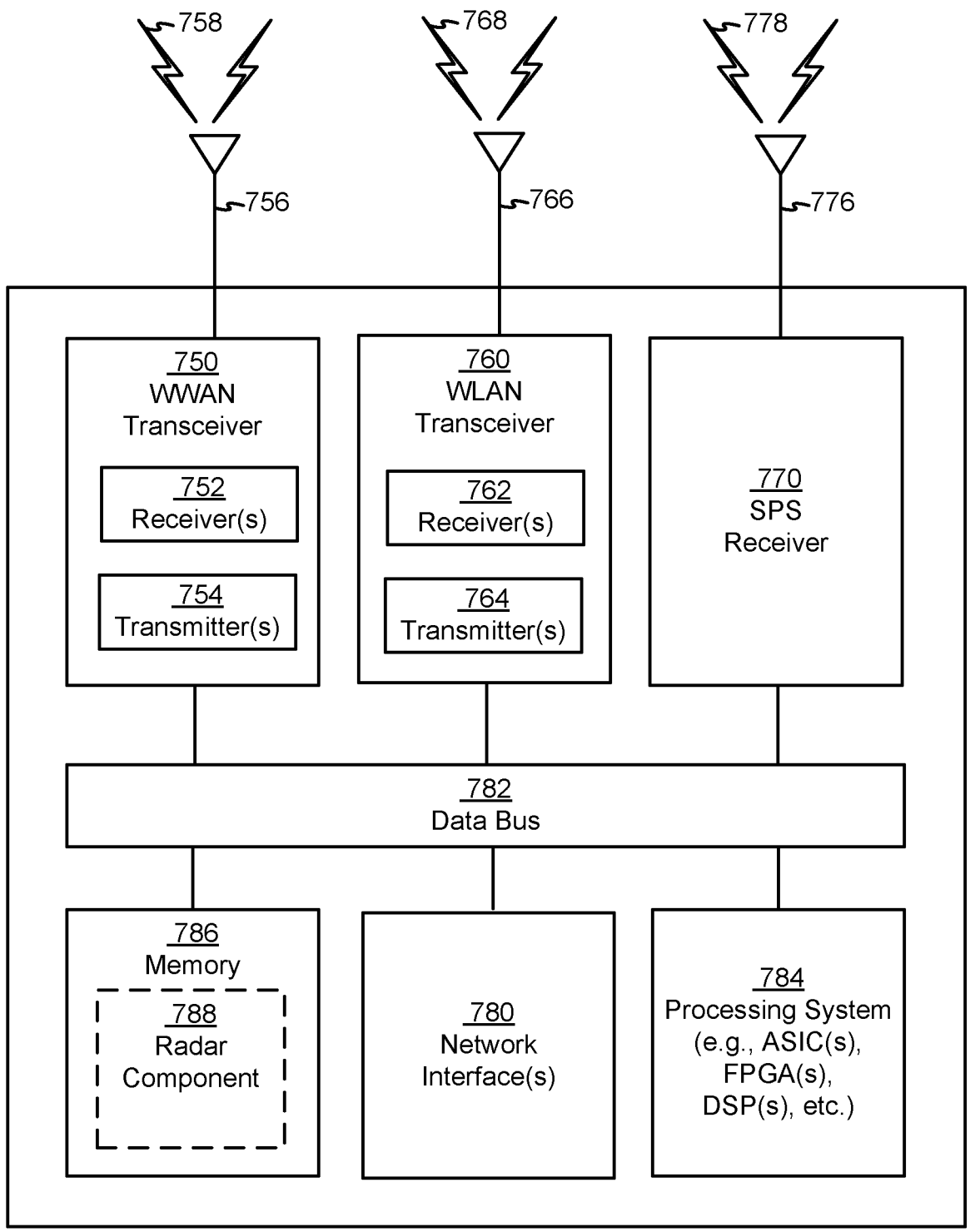

Referring to FIGS. 7A and 7B, several example components (represented by corresponding blocks) that may be incorporated into a UE, a base station (which may correspond to any of the base stations described herein), and a network entity (which may correspond to or embody any of the network functions described herein) to support the file transmission operations are shown. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE, base station, or network entity may include wireless wide area network (WWAN) transceiver 710 and 750, respectively, configured to communicate via one or more wireless communication networks (not shown), such as an NR network, an LTE network, a GSM network, and/or the like. The WWAN transceivers 710 and 750 may be connected to one or more antennas 716 and 756, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 710 and 750 may be variously configured for transmitting and encoding signals 718 and 758 (e.g., messages, indications, information, and so on), respectively, and conversely, for receiving and decoding signals 718 and 758 (e.g., messages, indications, information, pilots, and so on), respectively, in accordance with the designated RAT. Specifically, the transceivers 710 and 750 include one or more transmitters 714 and 754, respectively, for transmitting and encoding signals 718 and 758, respectively, and one or more receivers 712 and 752, respectively, for receiving and decoding signals 718 and 758, respectively.

The UE and the base station also include, at least in some cases, wireless local area network (WLAN) transceivers 720 and 760, respectively. The WLAN transceivers 720 and 760 may be connected to one or more antennas 726 and 766, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 720 and 760 may be variously configured for transmitting and encoding signals 728 and 768 (e.g., messages, indications, information, and so on), respectively, and conversely, for receiving and decoding signals 728 and 768 (e.g., messages, indications, information, pilots, and so on), respectively, in accordance with the designated RAT. Specifically, the transceivers 720 and 760 include one or more transmitters 724 and 764, respectively, for transmitting and encoding signals 728 and 768, respectively, and one or more receivers 722 and 762, respectively, for receiving and decoding signals 728 and 768, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 716, 726, 756, 766), such as an antenna array, that permits the respective apparatus to perform transmit "beamforming," as described herein. Similarly, a receiver may include or be coupled to a plurality of antennas (e.g., antennas 716, 726, 756, 766), such as an antenna array, that permits the respective apparatus to perform receive beamforming, as described herein. In an aspect, the transmitter and receiver may share the same plurality of antennas (e.g., antennas 716, 726, 756, 766), such that the respective apparatus can only receive or transmit at a given time, not both at the same time. A wireless communication device (e.g., one or both of the transceivers 710 and 720 and/or 750 and 760) of the UE and/or the base station may also comprise a network listen module (NLM) or the like for performing various measurements.

The UE and the base station may include, at least in some cases, satellite positioning systems (SPS) receivers 730 and 770. The SPS receivers 730 and 770 may be connected to one or more antennas 736 and 776, respectively, for receiving SPS signals 738 and 778, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 730 and 770 may comprise any suitable hardware and/or software for receiving and processing SPS signals 738 and 778, respectively. The SPS receivers 730 and 770 request information and operations as appropriate from the other systems and performs calculations necessary to determine positions of the UE and the base station using measurements obtained by any suitable SPS algorithm.

The base station and the network entity may each include at least one network interface 780 for communicating with other network entities. For example, the network interfaces 780 (e.g., one or more network access ports) may be configured to communicate with one or more network entities via a wire-based or wireless backhaul connection. In some aspects, the network interfaces 780 may be implemented as transceivers configured to support wire-based or wireless signal communication. This communication may involve, for example, sending and receiving messages, parameters, and/or other types of information.

The UE, the base station, and the network entity may include other components that may be used in conjunction with the operations as disclosed herein. The UE may include processor circuitry implementing a processing system 732 for providing functionality relating to, for example, RF sensing, and for providing other processing functionality. The base station may include a processing system 784 for providing functionality relating to, for example, RF sensing as disclosed herein, and for providing other processing functionality. The network entity may include a processing system for providing functionality relating to, for example, Wi-Fi sensing or RF sensing as disclosed herein, and for providing other processing functionality. In an aspect, the processing systems 732, 784 may include, for example, one or more general purpose processors, multi-core processors, ASICs, digital signal processors (DSPs), field programmable gate arrays (FPGA), or other programmable logic devices or processing circuitry.

The UE, the base station, and the network entity may include memory circuitry implementing memory components 740, 786 (e.g., each including a memory device), respectively, for maintaining information (e.g., information indicative of reserved resources, thresholds, parameters, and so on). In some cases, the UE, the base station, and the network entity may include sensing components 742, 788, respectively. The sensing components 742, 788 may be hardware circuits that are part of or coupled to the processing systems 732, 784 respectively, that, when executed, cause the UE, the base station, and the network entity to perform the functionality described herein. In other aspects, the sensing components 742, 788 may be external to the processing systems 732, 784 (e.g., part of a modem processing system, integrated with another processing system, etc.). Alternatively, the sensing components 742, 788 may be memory modules (as shown in FIGS. 7A, 7B) stored in the memory components 740, 786 respectively, that, when executed by the processing systems 732, 784 (or a modem processing system, another processing system, etc.), cause the UE, the base station, and the network entity to perform the functionality described herein.

The UE may include one or more sensors 744 coupled to the processing system 732 to provide movement and/or orientation information that is independent of motion data derived from signals received by the WWAN transceiver 710, the WLAN transceiver 720, and/or the SPS receiver 730. By way of example, the sensor(s) 744 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 744 may include a plurality of different types of devices and combine their outputs in order to provide motion information. For example, the sensor(s) 744 may use a combination of a multi-axis accelerometer and orientation sensors to provide the ability to compute positions in 2D and/or 3D coordinate systems.

In addition, the UE may include a user interface 746 for providing indications (e.g., audible and/or visual indications) to a user and/or for receiving user input (e.g., upon user actuation of a sensing device such a keypad, a touch screen, a microphone, and so on). Although not shown, the base station and the network entity may also include user interfaces.

Referring to the processing system 784 in more detail, in the downlink, IP packets from the network entity may be provided to the processing system 784. The processing system 784 may implement functionality for an RRC layer, a packet data convergence protocol (PDCP) layer, a radio link control (RLC) layer, and a medium access control (MAC) layer. The processing system 784 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 754 and the receiver 752 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 754 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE. Each spatial stream may then be provided to one or more different antennas 756. The transmitter 754 may modulate an RF carrier with a respective spatial stream for transmission.

At the UE, the receiver 712 receives a signal through its respective antenna(s) 716. The receiver 712 recovers information modulated onto an RF carrier and provides the information to the processing system 732. The transmitter 714 and the receiver 712 implement Layer-1 functionality associated with various signal processing functions. The receiver 712 may perform spatial processing on the information to recover any spatial streams destined for the UE. If multiple spatial streams are destined for the UE, they may be combined by the receiver 712 into a single OFDM symbol stream. The receiver 712 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station. These soft decisions may be based on channel estimates computed by a channel estimator. The soft decisions are then decoded and de-interleaved to recover the data and control signals that were originally transmitted by the base station on the physical channel. The data and control signals are then provided to the processing system 732, which implements Layer-3 and Layer-2 functionality.

In the uplink, the processing system 732 provides demultiplexing between transport and logical channels, packet reassembly, deciphering, header decompression, and control signal processing to recover IP packets from the core network. The processing system 732 is also responsible for error detection.

Similar to the functionality described in connection with the downlink transmission by the base station, the processing system 732 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station may be used by the transmitter 714 to select the appropriate coding and modulation schemes, and to facilitate spatial processing. The spatial streams generated by the transmitter 714 may be provided to different antenna(s) 716. The transmitter 714 may modulate an RF carrier with a respective spatial stream for transmission.

The uplink transmission is processed at the base station in a manner similar to that described in connection with the receiver function at the UE. The receiver 752 receives a signal through its respective antenna(s) 756. The receiver 752 recovers information modulated onto an RF carrier and provides the information to the processing system 784.

In the uplink, the processing system 784 provides demultiplexing between transport and logical channels, packet reassembly, deciphering, header decompression, control signal processing to recover IP packets from the UE. IP packets from the processing system 784 may be provided to the core network. The processing system 784 is also responsible for error detection.

For convenience, the UE, the base station, and/or the network entity are shown in FIGS. 7A, 7B as including various components that may be configured according to the various examples described herein. It will be appreciated, however, that the illustrated blocks may have different functionality in different designs.

The various components of the UE, the base station, and the network entity may communicate with each other over data buses 734, 782, respectively. The components of FIGS. 7A, 7B may be implemented in various ways. In some implementations, the components of FIGS. 7A, 7B may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by 710 to 746 may be implemented by processor and memory component(s) of the UE (e.g., by execution of appropriate code and/or by appropriate configuration of processor components). Similarly, some or all of the functionality represented by 750 to 788 may be implemented by processor and memory component(s) of the base station (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 732, 784 the transceivers 710, 720, 750, and 760, the memory components 740, 786 the sensing components 742, 788 etc.

Figure 8:
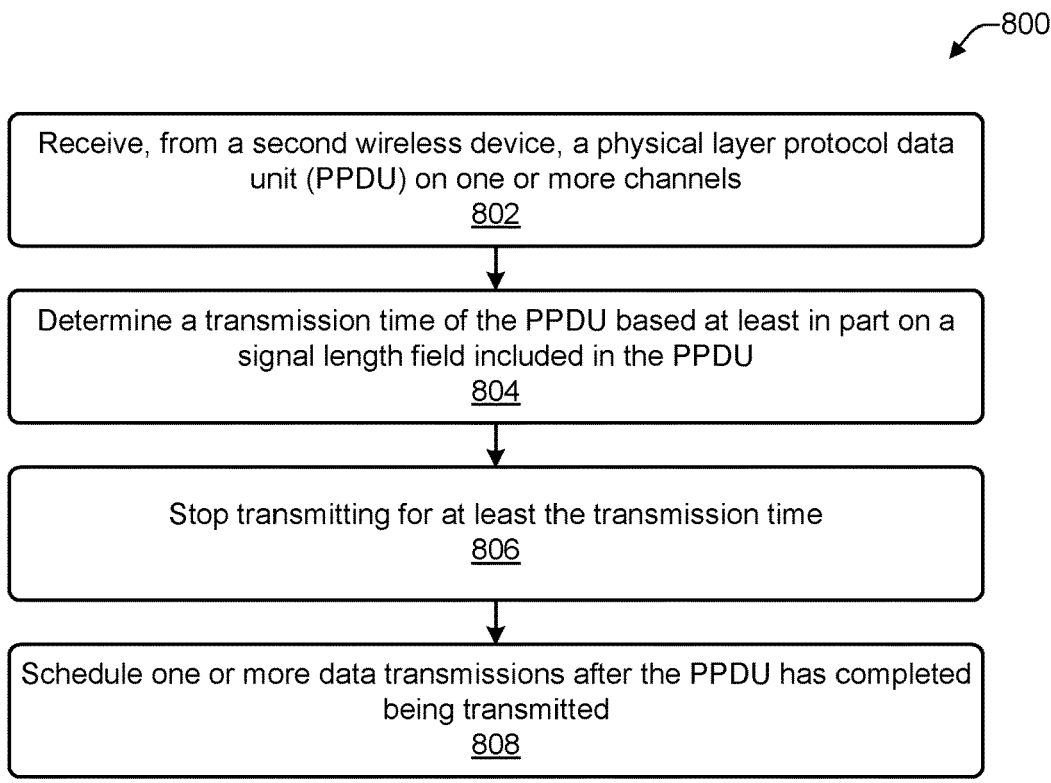
FIG. 8 illustrates an example process that includes determining a transmission time, according to aspects of the disclosure.

FIG. 8 illustrates an example process 800 that includes determining a transmission time, according to aspects of the disclosure. The process 800 may be performed by one or more of the other wireless devices 138.

At 802, the process may receive, from a second wireless device, a PPDU on one or more channels. At 804, the process may determine a transmission time associated with the PPDU based at least in part on a signal length field included in a first portion of the PPDU. At 806, the process may stop transmitting for at least the transmission time of the PPDU. At 808, the process may schedule one or more data transmissions after the PPDU has been transmitted. For example, in FIG. 1, a particular wireless device of the other wireless devices 138 may receive the PPDU 108 transmitted by the wireless device 102. The particular wireless device may determine a length of a transmission of the PPDU 108 based on the signal length specified by L-SIG 210 of FIG. 2. The particular wireless device may stop transmitting for at least the length of the transmission of the PPDU 108. The particular wireless device may schedule one or more data transmissions after the PPDU has completed being transmitted by the wireless device 102. In this way, the particular wireless device avoids a transmission collision with the PPDU 108.

It can be noted that, although particular frequencies, integrated circuits (ICs), hardware, and other features are described in the aspects herein, alternative aspects may vary. That is, alternative aspects may utilize additional or alternative frequencies (e.g., other the 60 GHz and/or 28 GHz frequency bands), antenna elements (e.g., having different size/shape of antenna element arrays), scanning periods (including both static and dynamic scanning periods), electronic devices (e.g., WLAN APs, cellular base stations, smart speakers, IoT devices, mobile phones, tablets, personal computer (PC), etc.), and/or other features. A person of ordinary skill in the art will appreciate such variations.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a wireless device comprising: transmitting a physical layer protocol data unit on one or more channels, wherein the physical layer protocol data unit comprises: a first portion comprising a signal length field indicating a duration of a transmission of the physical layer protocol data unit; and a second portion comprising a plurality of Wi-Fi sensing fields; receiving a reflected signal associated with the physical layer protocol data unit, the reflected signal comprising the physical layer protocol data unit reflected off of a target object; and receiving a leakage signal associated with the physical layer protocol data unit.

Clause 2. The method of clause 1, further comprising: determining a distance to the target object and a direction of the target object, based at least in part on the reflected signal and the leakage signal; and generating, based at least in part on the distance to the target object and the direction of the target object, a map that includes an approximate location of the target object.

Clause 3. The method of any of clauses 1 to 2, wherein: the first portion of the physical layer protocol data unit further comprises: a short training field (STF); a long training field (LTF); and the signal length field; and the first portion of the physical layer protocol data unit is compatible with an 802.11a standard, an 802.11n standard, an 802.11ac standard, an 802.11ax standard, and an 802.11be standard.

Clause 4. The method of any of clauses 1 to 3, wherein the second portion of the physical layer protocol data unit further comprises: a sequence type field to indicate that individual Wi-Fi Sensing fields of the plurality of Wi-Fi Sensing fields comprise either time domain sequences or frequency domain sequences; a number of transmit antennas used to transmit the physical layer protocol data unit; and a stream type field to indicate that the plurality of Wi-Fi Sensing fields comprise either a single stream or multiple-input multiple-output (MIMO) streams.

Clause 5. The method of clause 4, wherein the time domain sequences comprise one of: Zadoff-Chu based sequences; or orthogonal frequency division multiplexing (OFDM) based sequences.

Clause 6. The method of any of clauses 1 to 5, wherein transmitting the physical layer protocol data unit on the one or more channels comprises: transmitting the first portion of the physical layer protocol data unit at a first power level; and transmitting the second portion of the physical layer protocol data unit at a second power level that is less than the first power level.

Clause 7. The method of any of clauses 1 to 6, further comprising: determining an average Wi-Fi Sensing field value of the plurality of Wi-Fi Sensing fields, wherein the average Wi-Fi Sensing field value has an increased signal-to-noise ratio relative to individual Wi-Fi Sensing fields of the plurality of Wi-Fi Sensing fields.

Clause 8. The wireless device of any of clauses 8 to 7, wherein the time domain sequences comprise one of: Zadoff-Chu based sequences; or orthogonal frequency division multiplexing (OFDM) based sequences.

Clause 9. The wireless device of any of clauses 9 to 8, wherein the time domain sequences comprise one of: Zadoff-Chu based sequences; or orthogonal frequency division multiplexing (OFDM) based sequences.

Clause 10. A method of operating a first wireless device comprising: receiving, from a second wireless device, a physical layer protocol data unit on one or more channels, wherein the physical layer protocol data unit comprises: a first portion comprising a signal length field indicating a duration of a transmission of the physical layer protocol data unit; and a second portion comprising a plurality of Wi-Fi sensing fields; and scheduling one or more data transmissions based on the physical layer protocol data unit.

Clause 11. The method of clause 10, wherein scheduling the one or more data transmissions based on the physical layer protocol data unit comprises: determining a transmission time based at least in part on the signal length field; and scheduling the one or more data transmissions after the physical layer protocol data unit has completed being transmitted.

Clause 12. The method of any of clauses 10 to 11, further comprising: determining an amount of time to stop transmitting based at least in part on the signal length field; and stopping transmitting for at least the amount of time.

Clause 13. The method of any of clauses 10 to 12, wherein: the first portion of the physical layer protocol data unit further comprises: a short training field (STF); a long training field (LTF); and the signal length field; and the first portion of the physical layer protocol data unit is compatible with an 802.11a standard, an 802.11n standard, an 802.11ac standard, an 802.11ax standard, and an 802.11be standard.

Clause 14. The method of any of clauses 12 to 13, further comprising: means for determining an amount of time to stop transmitting based at least in part on the signal length field; and means for stopping transmitting for at least the amount of time.

Clause 15. The method of any of clauses 12 to 14, wherein: the first portion of the physical layer protocol data unit further comprises: a short training field (STF); a long training field (LTF); and the signal length field; and the first portion of the physical layer protocol data unit is compatible with an 802.11a standard, an 802.11n standard, an 802.11ac standard, an 802.11ax standard, and an 802.11be standard.

Clause 16. An apparatus comprising a memory and at least one processor communicatively coupled to the memory, the memory and the at least one processor configured to perform a method according to any of clauses 1 to 15.

Clause 17. An apparatus comprising means for performing a method according to any of clauses 1 to 15.

Clause 18. A non-transitory computer-readable medium storing computer-executable instructions, the computer-executable comprising at least one instruction for causing a computer or processor to perform a method according to any of clauses 1 to 15.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of operating a wireless device comprising:
    transmitting a physical layer protocol data unit on one or more channels, wherein the physical layer protocol data unit comprises:
        a first portion comprising a signal length field indicating a duration of a transmission of the physical layer protocol data unit; and
        a second portion comprising a plurality of Wi-Fi sensing fields,
        wherein the second portion of the physical layer protocol data unit further comprises:
            a sequence type field to indicate that individual Wi-Fi Sensing fields of the plurality of Wi-Fi Sensing fields comprise either time domain sequences or frequency domain sequences;
            a number of transmit antennas used to transmit the physical layer protocol data unit; and
            a stream type field to indicate that the plurality of Wi-Fi Sensing fields comprise either a single stream or multiple-input multiple-output (MIMO) streams.

2. The method of claim 1, further comprising:
    receiving a reflected signal associated with the physical layer protocol data unit, the reflected signal comprising the physical layer protocol data unit reflected off of a target object;
    receiving a leakage signal associated with the physical layer protocol data unit;
    determining a distance to the target object and a direction of the target object, based at least in part on the reflected signal and the leakage signal; and
    generating, based at least in part on the distance to the target object and the direction of the target object, a map that includes an approximate location of the target object.

3. The method of claim 1, wherein:
    the first portion of the physical layer protocol data unit further comprises:
        a short training field (STF);
        a long training field (LTF); and
        the signal length field; and
    the first portion of the physical layer protocol data unit is compatible with an 802.11a standard, an 802.11n standard, an 802.11ac standard, an 802.11ax standard, and an 802.11be standard.

4. The method of claim 1, wherein the time domain sequences comprise one of:
    Zadoff-Chu based sequences; or
    orthogonal frequency division multiplexing (OFDM) based sequences.

5. The method of claim 1, wherein transmitting the physical layer protocol data unit on the one or more channels comprises:
    transmitting the first portion of the physical layer protocol data unit at a first power level; and
    transmitting the second portion of the physical layer protocol data unit at a second power level that is less than the first power level.

6. The method of claim 1, further comprising:
    determining an average Wi-Fi Sensing field value of the plurality of Wi-Fi Sensing fields, wherein the average Wi-Fi Sensing field value has an increased signal-to-noise ratio relative to individual Wi-Fi Sensing fields of the plurality of Wi-Fi Sensing fields.

7. A wireless device comprising:
    a memory;
    at least one transceiver; and
    at least one processor communicatively coupled to the memory and the at least one transceiver, the at least one processor configured to:
        transmit, using the at least one transceiver, a physical layer protocol data unit (PPDU) on one or more channels, wherein the physical layer protocol data unit comprises:

a first portion comprising a signal length field indicating a duration of a transmission of the physical layer protocol data unit; and a second portion comprising a plurality of Wi-Fi Sensing (WiS) fields, wherein the second portion of the physical layer protocol data unit further comprises:

a sequence type field to indicate that individual Wi-Fi Sensing fields of the plurality of Wi-Fi Sensing fields comprise either time domain sequences or frequency domain sequences;

a number of transmit antennas used to transmit the physical layer protocol data unit; and a stream type field to indicate that the plurality of Wi-Fi Sensing fields comprise either a single stream or multiple-input multiple-output (MIMO) streams.

8. The wireless device of claim 7, further comprising:
a receive antenna array; and
a receive module configured to:
  receive a reflected signal associated with the physical layer protocol data unit, the reflected signal comprising the physical layer protocol data unit reflected off of a target object; and
  receive a leakage signal associated with the physical layer protocol data unit.

9. The wireless device of claim 8, further comprising:
one or more processors configured to:
  determine, based at least in part on the reflected signal and the leakage signal, a distance to the target object;
  determine, based at least in part on the reflected signal and the leakage signal, a direction of the target object; and
  create, based at least in part on the distance to the target object and the direction of the target object, a map that includes an approximate location of the target object.

10. The wireless device of claim 9, the one or more processors further configured to:
  determine an average Wi-Fi Sensing field value of the plurality of Wi-Fi Sensing fields, wherein the average Wi-Fi Sensing field value has an increased signal-to-noise ratio relative to individual Wi-Fi Sensing fields of the plurality of Wi-Fi Sensing fields.

11. The wireless device of claim 7, wherein:
the first portion of the physical layer protocol data unit further comprises:
  a short training field (STF);
  a long training field (LTF); and
  the signal length field;
the first portion of the physical layer protocol data unit is compatible with an 802.11a standard, an 802.11n standard, an 802.11ac standard, an 802.11ax standard, and an 802.11be standard; and
an 802.11 compatible device receiving the physical layer protocol data unit stops transmitting for a duration of time based at least in part on the signal length field.

12. The wireless device of claim 7, wherein the time domain sequences comprise one of:
  Zadoff-Chu based sequences; or
  orthogonal frequency division multiplexing (OFDM) based sequences.

13. The wireless device of claim 7, wherein transmitting the physical layer protocol data unit, using the at least one transceiver, on the one or more channels comprises:
  transmitting the first portion of the physical layer protocol data unit at a first power level; and
  transmitting the second portion of the physical layer protocol data unit at a second power level that is less than the first power level,
wherein the at least one transceiver comprises a transmit antenna array and a transmit module.

14. A non-transitory computer-readable storage medium storing computer executable code comprising:
code to transmit a physical layer protocol data unit (PPDU) on one or more channels, wherein the physical layer protocol data unit comprises:
  a first portion comprising a signal length field indicating a duration of a transmission of the physical layer protocol data unit; and
  a second portion comprising a plurality of Wi-Fi Sensing (WiS) fields,
  wherein the second portion of the physical layer protocol data unit further comprises:
    a sequence type field to indicate that individual Wi-Fi Sensing fields of the plurality of Wi-Fi Sensing fields comprise either time domain sequences or frequency domain sequences;
    a number of transmit antennas used to transmit the physical layer protocol data unit; and
    a stream type field to indicate that the plurality of Wi-Fi Sensing fields comprise either a single stream or multiple-input multiple-output (MIMO) streams.

15. The non-transitory computer-readable storage medium of claim 14, the computer executable code further comprising:
  code to receive a reflected signal associated with the physical layer protocol data unit, the reflected signal comprising the physical layer protocol data unit reflected off of a target object; and
  code to receive a leakage signal associated with the physical layer protocol data unit.

16. The non-transitory computer-readable storage medium of claim 15, the computer executable code further comprising:
  code to determine, based at least in part on the reflected signal and the leakage signal, a distance to the target object;
  code to determine, based at least in part on the reflected signal and the leakage signal, a direction of the target object; and
  code to create, based at least in part on the distance to the target object and the direction of the target object, a map that includes an approximate location of the target object.

17. The non-transitory computer-readable storage medium of claim 14, wherein:
the first portion of the physical layer protocol data unit further comprises:
  a short training field (STF);
  a long training field (LTF); and
  the signal length field; and
wherein the first portion of the physical layer protocol data unit is compatible with an 802.11a standard, an 802.11n standard, an 802.11ac standard, an 802.11ax standard, and an 802.11be standard.

18. The non-transitory computer-readable storage medium of claim 14, wherein the time domain sequences comprise either Zadoff-Chu based sequences or orthogonal frequency division multiplexing (OFDM) based sequences.

19. The non-transitory computer-readable storage medium of claim 14, the computer executable code further comprising:
  code to transmit the first portion of the physical layer protocol data unit at a first power level; and
  code to transmit the second portion of the physical layer protocol data unit at a second power level that is less than the first power level.

20. The non-transitory computer-readable storage medium of claim 14, the computer executable code further comprising:
  determine an average Wi-Fi Sensing field value of the plurality of Wi-Fi Sensing fields, wherein the average Wi-Fi Sensing field value has an increased signal-to-noise ratio relative to individual Wi-Fi Sensing fields of the plurality of Wi-Fi Sensing fields.

21. A wireless device comprising:
  means for transmitting a physical layer protocol data unit on one or more channels, wherein the physical layer protocol data unit comprises:
    a first portion comprising a signal length field indicating a duration of a transmission of the physical layer protocol data unit; and
    a second portion comprising a plurality of Wi-Fi sensing fields,
    wherein the second portion of the physical layer protocol data unit further comprises:
      a sequence type field to indicate that each of the plurality of Wi-Fi Sensing fields comprise either time domain sequences or frequency domain sequences;
      a number of transmit antennas used to transmit the physical layer protocol data unit; and
      a stream type field to indicate that the plurality of Wi-Fi Sensing fields comprise either a single stream or multiple-input multiple-output (MIMO) streams.

22. The wireless device of claim 21, further comprising:
  means for receiving a reflected signal associated with the physical layer protocol data unit, the reflected signal comprising the physical layer protocol data unit reflected off of a target object; and
  means for receiving a leakage signal associated with the physical layer protocol data unit;
  means for determining a distance to the target object and a direction of the target object, based at least in part on the reflected signal and the leakage signal; and
  means for generating, based at least in part on the distance to the target object and the direction of the target object, a map that includes an approximate location of the target object.

23. The wireless device of claim 21, wherein the first portion of the physical layer protocol data unit further comprises:
  a short training field (STF);
  a long training field (LTF); and
  the signal length field; and
  wherein the first portion of the physical layer protocol data unit is compatible with an 802.11a standard, an 802.11n standard, an 802.11ac standard, an 802.11ax standard, and an 802.11be standard.

24. The wireless device of claim 21, wherein the time domain sequences comprise one of:
  Zadoff-Chu based sequences; or
  orthogonal frequency division multiplexing (OFDM) based sequences.

25. The wireless device of claim 21, wherein the means for transmitting the physical layer protocol data unit on the one or more channels comprises:
  means for transmitting the first portion of the physical layer protocol data unit at a first power level; and
  means for transmitting the second portion of the physical layer protocol data unit at a second power level that is less than the first power level.

26. The wireless device of claim 21, further comprising:
  means for determining an average Wi-Fi Sensing field value of the plurality of Wi-Fi Sensing fields, wherein the average Wi-Fi Sensing field value has an increased signal-to-noise ratio relative to individual Wi-Fi Sensing fields of the plurality of Wi-Fi Sensing fields.

27. A method of operating a first wireless device comprising:
  receiving, from a second wireless device, a physical layer protocol data unit on one or more channels, wherein the physical layer protocol data unit comprises:
    a first portion comprising a signal length field indicating a duration of a transmission of the physical layer protocol data unit; and
    a second portion comprising a plurality of Wi-Fi sensing fields; and
  scheduling a data transmission based on the physical layer protocol data unit.

28. The method of claim 27, wherein scheduling the data transmission based on the physical layer protocol data unit comprises:
  determining a transmission time based at least in part on the signal length field; and
  scheduling the data transmission after completing the transmission of the physical layer protocol data unit.

29. The method of claim 27, further comprising:
  determining an amount of time to stop transmitting based at least in part on the signal length field; and
  stopping transmitting for at least the amount of time.

30. The method of claim 27, wherein:
  the first portion of the physical layer protocol data unit further comprises:
    a short training field (STF);
    a long training field (LTF); and
    the signal length field; and
  the first portion of the physical layer protocol data unit is compatible with an 802.11a standard, an 802.11n standard, an 802.11ac standard, an 802.11ax standard, and an 802.11be standard.

31. A first wireless device comprising:
  means for receiving a physical layer protocol data unit on one or more channels, wherein the physical layer protocol data unit comprises:
    a first portion comprising a signal length field indicating a duration of a transmission of the physical layer protocol data unit; and
    a second portion comprising a plurality of Wi-Fi Sensing (WiS) fields; and
  means for scheduling a data transmission based on the physical layer protocol data unit,
  wherein the second portion of the physical layer protocol data unit further comprises:
    a sequence type field to indicate that individual Wi-Fi Sensing fields of the plurality of Wi-Fi Sensing fields comprise either time domain sequences or frequency domain sequences;
    a number of transmit antennas used to transmit the physical layer protocol data unit; and a stream type field to indicate that the plurality of Wi-Fi Sensing fields comprise either a single stream or multiple-input multiple-output (MIMO) streams.

32. The first wireless device of claim 31, further comprising:
    means for determining a transmission time based at least in part on the signal length field; and
    means for scheduling the data transmission after completing the transmission of the physical layer protocol data unit.

33. The first wireless device of claim 31, further comprising:
    means for determining an amount of time to stop transmitting based at least in part on the signal length field; and
    means for stopping transmitting for at least the amount of time.

34. The first wireless device of claim 31, wherein:
    the first portion of the physical layer protocol data unit further comprises:
    a short training field (STF);
    a long training field (LTF); and
    the signal length field; and
the first portion of the physical layer protocol data unit is compatible with an 802.11a standard, an 802.11n standard, an 802.11ac standard, an 802.11ax standard, and an 802.11be standard.

\* \* \* \* \*